United States Patent [19]
Burgess

[11] 3,888,120
[45] June 10, 1975

[54] VORTEX TYPE FLOWMETER WITH STRAIN GAUGE SENSOR

[75] Inventor: Thomas H. Burgess, Horsham, Pa.

[73] Assignee: Fischer and Porter Co., Warminster, Pa.

[22] Filed: Apr. 26, 1973

[21] Appl. No.: 354,803

[52] U.S. Cl. .................................. 73/194 B
[51] Int. Cl. ..................... G01f 1/00; G01p 5/00
[58] Field of Search ................ 73/194 B, 71.4

[56] References Cited
UNITED STATES PATENTS

| | | | |
|---|---|---|---|
| 3,116,639 | 1/1964 | Bird | 73/194 |
| 3,589,185 | 6/1971 | Burgess | 73/194 |
| 3,650,152 | 3/1972 | White | 73/194 |
| 3,720,104 | 3/1973 | Zanker | 73/194 |

Primary Examiner—Herbert Goldstein

[57] ABSTRACT

A flowmeter including a conduit-forming a passage for the fluid to be measured and an obstacle assembly mounted therein capable of generating strong, stabilized fluidic oscillations which cause a deflectable non-streamlined section of the assembly to vibrate at a corresponding rate. The vibrations are sensed by a strain gauge to produce a signal whose frequency is proportional to the flow rate of the fluid passing through the conduit.

8 Claims, 9 Drawing Figures

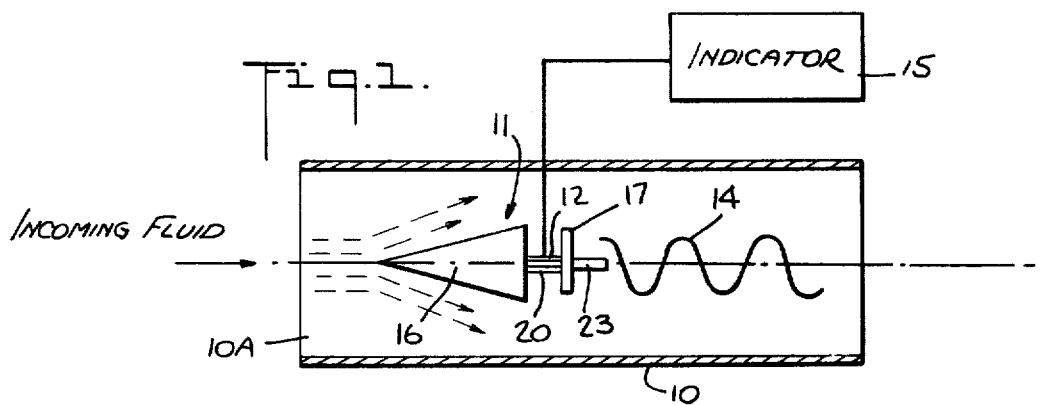
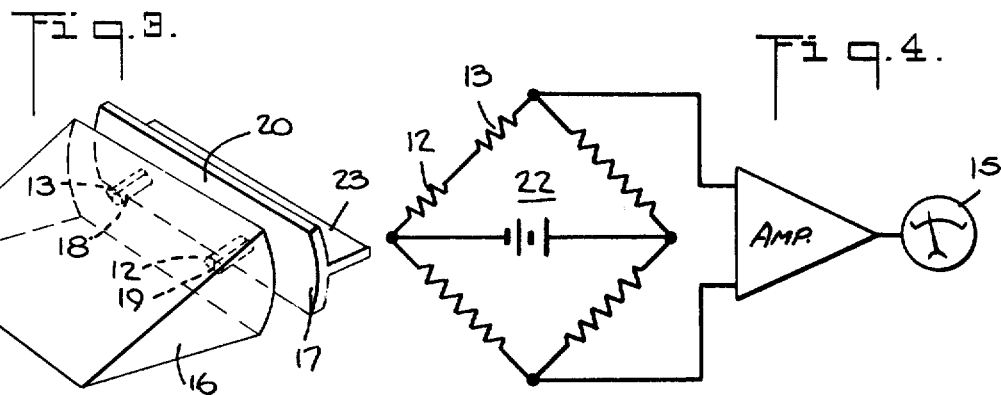
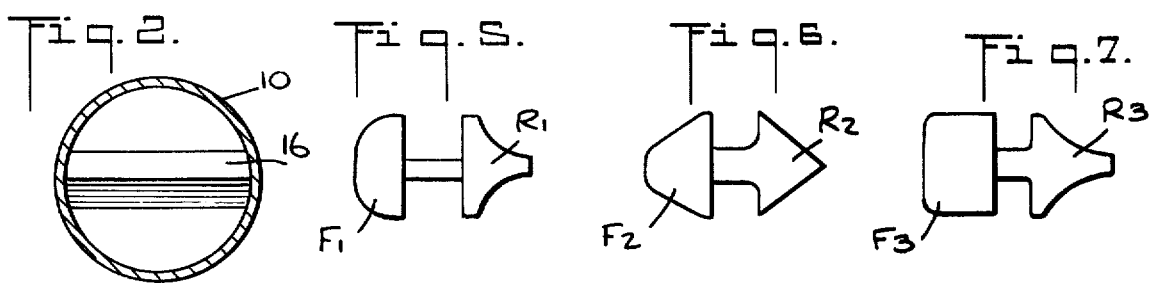
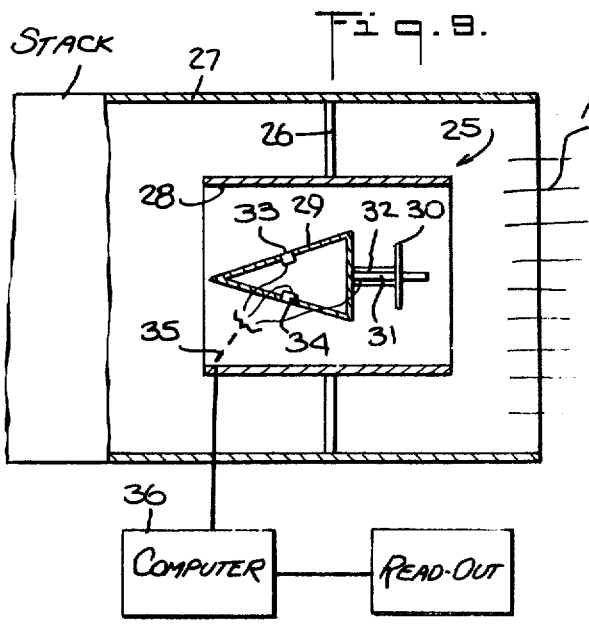
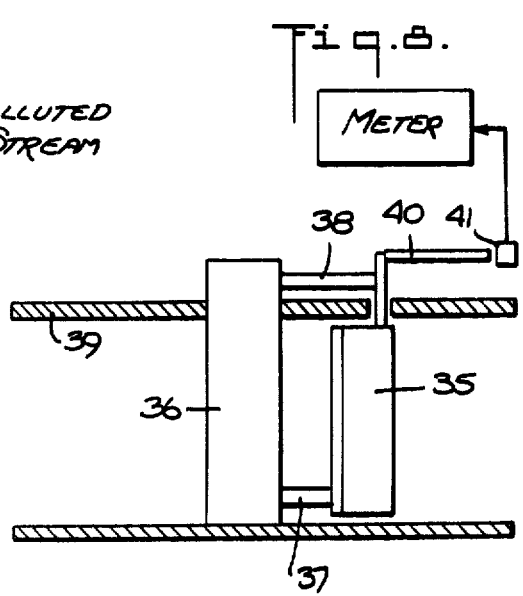

3,888,120

VORTEX TYPE FLOWMETER WITH STRAIN GAUGE SENSOR

BACKGROUND OF THE INVENTION

This invention relates generally to flowmeters for metering liquids or gases, and more particularly to plowmeters of the vortex-shedding type and to improved sensors therefor.

It is well known that under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. It is this phenomenon which is exploited to create a flowmeter. One such flowmeter is disclosed in the Bird U.s. Pat. No. 3,116,639.

My prior U.s. Pat. No. 3,589,185 discloses an improved form of vortex-type flowmeter wherein the signal derived from the fluid oscillation is relatively strong and stable to afford a favorable signal-to-noise ratio insuring accurate flow-rate information over a broad range. In this meter, an obstacle assembly is mounted in the flow conduit, the assembly being constituted by a block positioned across the conduit with its longitudinal axis at right angles to the direction of fluid flow, a strip being similarly mounted across the conduit behind the block and being spaced therefrom to define a gap which serves to trap Karman vortices and to strengthen and stabilize the vortex street. This street is sensed to produce a signal whose frequency is proportional to flow rate.

The sensor in my prior patent is in the form of a thermistor which is electrically heated by a constant current and is cooled by the fluidic oscillations. The thermistor has a large negative temperature coefficient of resistance, as a consequence of which its internal resistance varies periodically in accordance with the fluidic oscillations in the downstream wake. The electrical signal resulting from the periodic variations in resistance is applied to an indicator calibrated in terms of flow rate.

The use of a thermistor as a sensor has several disadvantages. The thermistor has a relatively large mass and exhibits thermal lag, as a consequence of which the amplitude of the signal derived from the thermistor tends to decrease as the signal frequency goes higher. This can be overcome by a signal conditioner adapted to compensate for the thermistor frequency-response curve and to provide a signal whose amplitude is substantially constant throughout the useful frequency range. But such signal conditioners add to the cost of the system.

Also, thermistors and other known types of wake sensors such as those of the pressure or force-responsive type, tend to pick up a large amount of extraneous turbulence within the wake. This can be overcome to some degree by enlarging the size of the sensor but then the enhanced size of the sensor adversely affects the hydraulics of the vortex street. Moreover, wake sensors are subject to drag forces associated with the flow and they are also susceptible to damage from the impact of particulate matter contained in the fluid being metered. This is particularly serious when the fluid being metered is the highly polluted output of an industrial exhaust stack.

SUMMARY OF THE INVENTION

In view of the foregoing, the main object of this invention is to provide a practical, low cost flowmeter of the vortex type wherein the obstacle assembly mounted within the flow conduit is capable of generating strong, stabilized fluidic oscillations which cause a deflectable section of the assembly to vibrate at a corresponding rate, the vibrations being sensed to produce a signal whose frequency is proportional to the flow rate of the fluid passing through the conduit.

More specifically, it is an object of this invention to provide a flowmeter of the above-identified type wherein the obstacle assembly is constituted by a front section fixedly mounted within the conduit and a rear section resiliently cantilevered onto the front section whereby the rear section is slightly deflectable and is excited into vibration by fluidic oscillations generated in the flow conduit.

Also an object of the invention is to provide a vortex-type flowmeter in which the vibrations of the deflectable rear section are sensed by one or more strain gauges to produce periodic changes in electrical resistance resulting in a signal whose frequency is proportional to the vibratory rate of the rear section and hence to the flow rate of the fluid.

A significant feature of the invention resides in the fact that the strain gauge sensor need not be exposed to the fluidic oscillations in order to function, and may be concealed within the obstacle assembly whereby the sensor is protected from particulate matter or corrosive plaid constituents that might otherwise degrade or destroy the sensor.

Yet another object of this invention is to provide a vortex-type flowmeter adapted to operate within an exhaust stack in conjunction with detectors for determining the concentration of pollutants in the flue gases passing through the stack, the flowmeter sensor and detector outputs being combined to produce a signal for recording or displaying the integrated pollutant flow over a predetermined period of time.

Briefly stated, these objects are attained in a flowmeter including a flow conduit forming a passage for the fluid to be metered and an obstacle assembly mounted therein which incorporates a vibration sensor. The assembly is constituted by a front body section having a contoured cross section which is preferably uniform throughout the longitudinal axis thereof, the front section being fixedly positioned across the conduit with its longitudinal axis at right angles to the flow axis of the conduit.

Similarly positioned across the conduit behind the front section is a rear section which is spaced from the front section and secured thereto by means of a resilient support to define a gap which serves to trap Karman vortices, the rear section having a non-streamlined shape which interferes with and acts to strengthen and stabilize the vortex street. Because the rear section is slightly deflectable it is excited into vibration by the vortices at a rate whose frequency is proportional to the flow rate of the fluid.

The vibrating motion of the rear section is sensed by a strain gauge which is preferably disposed within the cantilever structure to produce a signal indicative of the flow rate. To enhance the vibrating action of the rear section, a tail element may be extended downstream therefrom.

Since the phenomenon underlying the present invention may be exploited to measure the flow of a river or the velocity of wind, it is not essential that the stream to be measured be conducted through a flow tube.

OUTLINE OF THE DRAWING

For a better understanding of the invention as well as other objects and further features thereof, reference is made to the following detailed description to be read in conjunction with the accompanying drawing, wherein:

FIG. 1 is a longitudinal section taken through a preferred embodiment of a flowmeter in accordance with the invention;

FIG. 2 is a front end view of the meter shown in FIG. 1;

FIG. 3 is a perspective view of the obstacle assembly incorporated in the meter;

FIG. 4 shows the electrical circuit of the strain gauge sensor associated with the meter;

FIGS. 5, 6 and 7 shows alternative forms of obstacle assemblies;

FIG. 8 shows another preferred embodiment of a flowmeter; and

FIG. 9 shows a flowmeter in accordance with the invention disposed in a stack for measuring pollutants.

DESCRIPTION OF THE INVENTION

Referring now to the drawing and more particularly to FIGS. 1 to 3, a flowmeter of the vortex type according to the invention comprises a flow conduit 10, an obstacle assembly generally designated by numeral 11, mounted within the assembly, and a sensor constituted by strain gauges 12 and 13 supported in the assembly.

Conduit 10, which is shown as having a circular cross-section but which may be in other cross-sectional forms, includes an inlet 10A into which a fluid to be metered is introduced. The flow impinges on obstacle assembly 11 which acts to divide the flow around the obstacle, the assembly producing fluidic perturbations in the form of a Karman vortex street. The nature of this phenomenon is explained in the text by Schlichtling, "Boundary Layer Theory" (McGraw-Hill-1960).

The resultant fluidic oscillations in the downstream wake, roughly represented by trace line 14, are sensed by strain gauges 12 and 13 to produce an electrical signal which is applied to a suitable indicator or recorder 15 to provide flow rate readings.

Obstacle assembly 11 is formed by a front section 16 and a rear section 17 mounted behind the front section by a cantilever support constituted by a pair of resilient pins 18 and 19. Front section 16 is a contoured block having a triangular or delta shaped cross-section which is uniform throughout the longitudinal axis of the block, this axis being perpendicular to the flow axis of the conduit. The ends of the front section are secured to the wall of the conduit whereby the front section is fixedly held within the conduit.

The apex of the block faces the incoming fluid, the inclined sides thereof forming leading edges which are swept by the flow of fluid to create vortices. The invention is not limited to obstacle bodies of this shape, for this may take other shapes such as those disclosed in my prior U.S. Pat. No. 3,589,185.

The rear section 17 takes the form of a non-streamlined body which in this embodiment is in strip form and is maintained by the pins 18 and 19 in spaced relation to the front section, the plane of the strip being parallel to the flat base of the block. The rear section shape is such as to interfere with the vortex street and the cavity or gap 20 created between the front section block and the rear section tends to trap the vortices and to strengthen and stabilize the vortex street produced thereby. While a strip is shown in the wake of the front section shedding block, it is to be understood that the invention encompasses any rear section whose shape and diameter are such as to interfere with the vortex street, as distinguished from a vane or other streamlined body which though acted upon by the street does not interfere therewith.

Because rear section 17 is cantilevered by means of resilient pins, it is deflectable. The pins, though functioning as tines, have sufficient rigidity so as to permit only a slight deflection of the rear section. As a consequence of the fluidic oscillations produced within the conduit, the rear section is excited into vibration at a rate corresponding to the frequency of the oscillations. The natural resonance of the deflectable rear section is such as to be well outside the normal frequency range of the meter whereby mechanical resonance peaks are absent and the amplitude of the vibrating motion accurately reflects the amplitude of the fluidic oscillations.

Because the deflectable system is relatively rigid, the total excursion of the rear section is minute even at the highest amplitudes of fluidic oscillation, so that metal fatigue of the supporting pins, as a result of the vibrating action, is minimized and failures do not arise after prolonged operation.

It is important to note that the magnitude of deflection is not of primary importance, for the flowrate information is given by frequency, not the amplitude of vibration. Hence while the deflection magnitude is made extremely small in order to provide an acceptable fatigue life, this does not militate against a readable output of varying frequency.

From the basic Strouhal Number relationship for vortex shedding bodies, the oscillation frequency is approximately equal to 0.22 ($V/D$) where $V$ is the velocity past the body and $D$ is the body width.

For a practical flowmeter of 4 inch size, $D$ might be 1 inch and $V$ 10 feet per second, giving an output frequency of approximately 25 Hz. For continuous operation, this is approximately 700 million cycles per year. In order therefore for the flowmeter to have a prolonged life, it must be designed to experience very small strains and deflections. Typically, the rear body of the obstacle assembly might be designed for a maximum deflection of 0.002 inch at full scale flow.

Since the deflection is a function of the dynamic pressure, a 15 to 1 range flowmeter would then require sensing the frequency of a dynamic deflection having an amplitude $0.002/15^2$ or approximately $1 \times 10^{-5}$ inches.

In addition to its fatigue limitations, a large displacement design is also disadvantageous in that flowmeter linearity is dependent on the consistency of the width of the vortex street. Large motions tend to bring about changes in vortex street width with changes in frequency, thereby introducing a non-linearity.

The strain gauges extend between the front and rear sections along the support pins and are periodically stressed as the deflectable rear section undergoes vibration to produce corresponding changes in resistance. By connecting the two strain gauges in series in a bridge circuit 22, as shown in FIG. 4, the periodic change in resistance is converted into an electrical signal whose frequency is proportional to flow rate. Such gauges make use of a wire or grid whose electrical resistance is caused to change as a function of the strain imposed thereon, for when a wire is stretched, its length and diameter are altered with a resultant change in its ohmic value.

Alternatively, one may make use of semi-conductor, solid state strain gauges. In practice one may use a single gauge to provide a signal representing flow rate.

The pins for supporting the rear sections may be made of hollow tubing to receive the strain gauges, thereby concealing the gauges and protecting them from contaminants in the fluid. The leads from these gauges are preferably extended through the front section body and from there to the exterior of the conduit.

While the vibrating motions of the rear section is disclosed as being sensed by strain gauges, it will be appreciated that other forms of detectors, such as electromagnetic motion-sensing transducers, may be used for the same purpose. The vibrating motion may be enhanced, as shown in FIG. 1, by securing a tail 23 to the rear section 17, the tail extending downstream. In practice, the front and rear sections could be rigidly interconnected and the tail be made deflectable relative thereto. The downstream section of the assembly carries out two functions, for this section which interferes with the wake not only stabilizes it to enhance its detectability, but its vibratory motion gives rise to the output signal.

The obstacle assemblies may take a variety of other forms as shown in FIGS. 5, 6 and 7 but in each instance, the shape of the front section ($F_1$, $F_2$ and $F_3$) must be such as to generate a vortex street and the shape of the rear section ($R_1$, $R_2$ and $R_3$) must be non-streamlined so as to interfere with this street and stabilize the wake.

In the arrangement previously disclosed, the deflection of the rear section is sensed within the conduit. It is also possible, as shown in FIG. 8, to sense the deflection externally. In this arrangement, the rear section 35 is supported from the front section 36 by two struts 37 and 38, one being within flow tube 39 and the other outside of the tube. In this instance the strain gauge is placed on the external strut 38 or in the alternative by an arm 40 attached to this strut, the movement of the arm being sensed. Electrical output methods of sensing would include the use of a magnet attached to the end of the moving arm giving rise to flux changes in an associated coil 41.

A flowmeter in accordance with the invention may also be used in conjunction with pollution concentration detectors for monitoring the emission from industrial smokestacks, power plant stacks and other stacks serving to discharge exhausts or flue gases into the atmosphere. The growing social concern with environmental pollution has created a need for an effective, low cost pollution monitor.

While various techniques have heretofore been known for determining the amount of pollutants being emitted, such as sulfur dioxide, nitrous oxide, soot and other particular matter, these techniques are not continuous and involve difficult measuring procedures. For example, one known technique is to measure on a sampling basis, the velocity of a stack output by means of a pilot tube and concurrently measuring the concentration of pollutants in the stack output, the total flow of pollutants during a given period being thus calculated on the basis of the velocity and concentration sample values obtained.

The present invention provides a simple unit which is insertable into the stack for continuously measuring both flow velocity and the concentration of pollutants. As shown in FIG. 9, the unit is constituted by a flowmeter, generally designated by numeral 25, which is supported by a suitable spider 26 concentrically within an exhaust stack 27.

The flowmeter 25 includes a flow conduit 28 within which is mounted an obstacle assembly of the type shown in FIG. 1 consisting of a front section 29 and a rear section 30 supported behind the front section by pins 31. The fluidic variations produced within the flow tube by the obstacle assembly are sensed by a stain gauge sensor 32.

But unlike the front section shown in FIG. 1, the body of front section 29 is hollow and contains a pair of detectors 33 and 34 whose heads are exposed at the leading edges of the front section. Detector 33 is sensitive to pollutants of interest, say sulfur dioxide to produce an output signal proportional to the concentration of the pollutant. Detector 34 is responsive to the temperature of the fluid being metered.

The respective outputs of sensors 32, 33 and 34 are fed through a common cable 35 leading out of the stack to an electronic computer 36 where the values of flow velocity, pollutant concentration and temperature are combined to provide an output signal indicative of the integrated pollutant flow over a predetermined period, so that the total pounds of pollutant can be monitored, not just its concentration.

It is the total mass of the pollutants discharged into the atmosphere within a given period that needs to be known, rather than the concentration thereof at any given moment. For example, a 12-inch diameter, large stack operating at high velocity could well put out fifty times the total amount of pollutant as a 3-inch stack (allowing for velocity differences), even though both were operating at the same pollution concentration over the same period of time.

This result achieved by combining concentration and flow rate outputs so that with suitable scaling, the weight of the pollutants discharged in a given period could be displayed (% $SOx$ total flow through stack = lbs. $SO_x$).

The unit installed in the stack is preferably mounted near the top thereof so that no pressure correction is necessary to convert the volumetric information from the vortex meter to mass flow rate, only temperature correction being required.

In the stack and in other forms, the rear section of the assembly could be constituted by both deflectable and non-deflectable elements being toward the end of the body. In cases where the velocity varies greatly across the cross-section of the flow conduit, such as laminar flow, this type of construction could be used to sense only the more uniform center region, thereby improving the signal-to-noise ratio. In a stack or large pipe, the non-deflecting elements could make possible the elimination of conduit 28 (FIG. 9) by moving the end effects on the body sufficiently far from the measurement area.

While there have been shown and described preferred embodiments of a vortex type flowmeter with strain gauge sensor, it will be appreciated that many changes and modifications may be made therein without, however, departing from the essential spirit thereof. Thus, in practice one can use a pair of strain gauges in conjunction with each pin or cantilever beam, one above and one below the beam, so that the downward bending of the beam produces a tension strain on the top gauge and a compression strain on the bottom gauge; the reverse being true when the bend is upward. Hence, one gauge in the pair increases in resistance, while the other is caused to decrease to an equivalent amount. By placing these gauges in parallel branches of a Wheatstone bridge, a large output will be produced as a result of the bending actions.

I claim:

1. A flowmeter of the vortex type comprising:
   A. a flow conduit through which fluid to be measured is conducted;
   B. an obstacle assembly disposed within said conduit and constituted by a front section fixedly mounted across the conduit and contoured to cause flow separation and downstream vortex street having a periodicity which is a function of flow rate, and a rear non-streamlined section cantilevered behind said front section to define a gap which traps the vortices of the vortex street and strengthens and stabilizes the vortex street, said rear section being shaped to interfere with said vortex street, said rear section being slightly deflectable to a degree in which the maximum deflection thereof is not in excess of about 0.002 inches whereby it is excited into minute vibration by said street; and
   C. strain gauge means to sense the vibrating motion of said rear section to produce a signal whose frequency is proportional to flow rate.

2. A flowmeter as set forth in claim 1, wherein said conduit has a circular cross-section.

3. A flowmeter as set forth in claim 1 wherein said conduit is a river.

4. A flowmeter as set forth in claim 1, wherein said front section has a delta profile whose apex faces the incoming fluid.

5. A flowmeter as set forth in claim 1, wherein said cantilever structure is formed by pins connecting said front section to said rear section.

6. A flowmeter as set forth in claim 5, wherein at least one of said pins is hollow and said sensor is a strain gauge contained within the pin.

7. A flowmeter as set forth in claim 1, wherein said front section is hollow and incorporates at least one detector whose head is exposed to the fluid in the conduit to detect the concentration of pollutants contained in the fluid being metered.

8. A flowmeter as set forth in claim 7, further including an electronic computer coupled to said detector and said sensor to determine the integrated pollutant flow over a predetermined period of time.

* * * * *